United States Patent

Kamata et al.

[11] 4,433,103
[45] Feb. 21, 1984

[54] IMPACT-RESISTANT METHACRYLIC RESIN COMPOSITION

[75] Inventors: Kazumasa Kamata, Hiroshima; Masamitsu Tateyama, Yamaguchi, both of Japan

[73] Assignee: Mitsubishi Rayon Company Ltd., Tokyo, Japan

[21] Appl. No.: 498,511

[22] Filed: May 26, 1983

[51] Int. Cl.$^3$ .................. C08L 51/00; C08L 33/12; C08F 265/06

[52] U.S. Cl. .................. 525/81; 525/82; 525/85; 525/304; 525/305; 525/307; 525/309

[58] Field of Search .................. 525/902, 81, 307, 85, 525/309

[56] References Cited

U.S. PATENT DOCUMENTS

| | | | |
|---|---|---|---|
| 3,661,994 | 5/1972 | Hwa et al. | 525/902 |
| 3,793,402 | 2/1974 | Owens | 525/307 |
| 4,341,883 | 7/1982 | Gift | 525/81 |

*Primary Examiner*—Carman J. Seccuro
*Attorney, Agent, or Firm*—Cushman, Darby & Cushman

[57] ABSTRACT

An impact-resistant methacrylic resin composition comprising a multilayer structure methacrylic resin [II] is provided. The resin [II] is obtained by the following sequential four polymerization stages (i) through (iv):

(i) forming 5-50 wt. parts of a hard crosslinked resin (A) containing at least 80 wt. % of methyl methacrylate units;

(ii) obtaining 100 wt. parts of a multilayer structure acrylic elastomer [I] by forming on the periphery of resin (A) 95-50 wt. parts of a crosslinked acrylic acid ester copolymer (B) by polymerizing a monomer mixture comprising 69.9-89.9 wt. % of at least one alkyl ($C_{1-8}$) acrylate, 10-30 wt. % of styrene or a mixture of styrene and a derivative thereof and 0.1-10 wt. % of

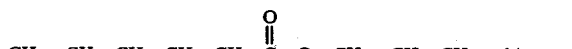

and/or

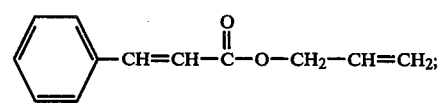

(iii) forming on the periphery of elastomer [I] 5-100 wt. parts of a hard crosslinked resin (C) by polymerizing a crosslinkable monomer mixture comprising 80-99.9 wt. % of methyl methacrylate, 0-19.9 wt. % of at least one alkyl ($C_{1-8}$) acrylate, 0-10 wt. % of other copolymerizable vinyl monomer and 0.1-10 wt. % of a copolymerizable polyfunctional monomer having at least two C—C double bonds in the molecule; and then (iv) forming on the periphery of resin (C) 5-1000 wt. parts of a hard non-crosslinked resin (D) by polymerizing a non-crosslinkable monomer or non-crosslinkable monomer mixture comprising 80-100 wt. % of methyl methacrylate, 0-20 wt. % of at least one alkyl ($C_{1-8}$) acrylate and 0-10 wt. % of another copolymerizable vinyl monomer, the resin (D)/resin (C) weight ratio being from 0.5 to 200. The resin [II] may be blended with a methacrylic resin [III] formed by polymerizing 80-100 wt. % of methyl methacrylate and 0-20 wt. % of a vinyl or vinylidene monomer in such a proportion that the content of the acrylic elastomer [I] is 1-70 wt. % based on the total composition.

27 Claims, No Drawings

IMPACT-RESISTANT METHACRYLIC RESIN COMPOSITION

BACKGROUND OF THE INVENTION (1) Field of the Invention

This invention relates to an impact-resistant methacrylic resin composition excellent in surface appearance and transparency.

(2) Description of the Prior Art

A methacrylic polymer resin composed mainly of methyl methacrylate has such characteristics as a beautiful appearance, excellent transparency, high weather resistance and good fabricability and is widely used in various fields as cast sheets, extrusion-molded articles and injection-molded articles. However, this resin is hard and brittle. Several methods have heretofore been proposed to eliminate this defect, but no method for eliminating the brittleness without sacrificing the characteristics of the methacrylic resin has yet been realized.

The most popular and effective method for overcoming the defect of brittleness of a methacrylic resin and imparting an impact resistance thereto comprises dispersing particles of an elastomer, which is rubbery at normal temperature, discontinuously in a continuous phase of a methacrylic resin. As the rubbery elastomer, there are used an unsaturated rubbery elastomer composed mainly of butadiene, and a saturated rubbery elastomer, such as an acrylic acid ester polymer, composed mainly of butyl acrylate, 2-ethylhexyl acrylate or other acrylates and an ethylene/vinyl acetate copolymer. An unsaturated rubber elastomer has the problem of poor weather resistance due to unsaturated double bonds present in the main polymer chain. A saturated rubbery elastomer has the problems of, for example, poor modulus of elasticity and elastic recovery of the rubber component per se and poor graft-polymerizability with a hard resin component, therefore insufficient impact resistance and degraded transparency and surface gloss. Furthermore, the surface appearance is not satisfactory because of flow mark.

Important factors in preparing an impact-resistant resin composition of the above-mentioned two-component type comprising a discontinuous phase of rubbery elastomer particles homogeneously dispersed in a continuous phase of a hard resin such as a methacrylic resin are the particle size of the rubbery elastomer, the crosslinking degree of the rubber elastomer, the graft polymerizability of the hard resin phase to the rubber phase and the molecular weight of the hard resin phase. In fact, the relative superiority and balance of the resin characteristics are greatly influenced by these factors. Among these factors, the crosslinking degree of the rubber phase, the graft polymerizability of the hard resin to the rubber phase and the molecular weight of the hard resin phase are especially important.

As the crosslinking degree of the rubbery elastomer is high, the surface appearance characteristics such as the surface gloss and prevention of flow marks are improved, but the impact resistance is degraded.

The graft polymerizability of the hard resin phase to the rubber phase greatly influences the compatibility and dispersibility of the rubbery elastomer with the continuous resin phase. The impact resistance, transparency, stress-whitening resistance, surface gloss and flow processability are greatly influenced by this graft polymerizability. When a saturated rubbery elastomer is used, the graft polymerizability is ordinarily low, and special care should be taken. It has recently been proposed that a specific polyfunctional monomer called a "copolymerizable grafting monomer" be used in the polymerization for formation of an acrylic elastomer. This monomer, however, is used as a crosslinking agent in a broad sense and no complete improvement can be obtained.

A higher molecular weight of the hard resin phase is effective for improving the impact resistance but causes degradation of surface appearance and fabricability.

As is apparent from the foregoing description, the factors behave independently, and it is very difficult to set the general properties of an impact-resistant resin composition with a good balance. Thus, an impact-resistant methacrylic resin comparable to an unmodified methacrylic resin in transparency, surface appearance, and fabricability has not been developed.

In connection with an impact-resistant resin composition or impact-resistant methacrylic resin composition comprising an acrylic acid ester elastomer as the rubber phase, which is excellent in weather resistance, there has recently been proposed a method in which a hard resin is included in the interiors of rubber particles so as to improve the impact resistance-manifesting effect of the rubber phase, the transparency and stress-whitening resistance of the shaped article, and the pearl-like gloss due to deformation of the rubber particles (see Japanese Examined Patent Publication No. 52-30996, Japanese Unexamined Patent Publication No. 48-55233, U.S. Pat. No. 3,661,994 and U.S. Pat. No. 3,793,402). Indeed, the intended effects can be attained to some extent according to this method, but the resulting resin composition is still inferior to an unmodified methacrylic resin in transparency and surface appearance.

SUMMARY OF THE INVENTION

Under the above-mentioned background, it is a primary object of the present invention to provide a methacrylic resin composition having a high impact resistance without impairing such inherent properties of the methacrylic resin as high transparency, excellent surface appearance and good weather resistance.

This object can be attained when (i) a crosslinkable monomer having a special structure is used as a comonomer component at the polymerizing step for forming an acrylic acid ester elastomer containing in the interiors of particles thereof a hard crosslinked resin composed mainly of methyl methacrylate, (ii) at the step of grafting a hard resin composed mainly of methyl methacrylate to the resulting elastomer, the monomer component for this hard resin is divided into two portions, one portion initially polymerized while being crosslinked and the remaining portion being polymerized into a non-crosslinked hard resin, and (iii) the ratio of the crosslinked graft-polymerized portion to the non-crosslinked graft-polymerized portion is adjusted within a specific range.

More specifically, in accordance with one aspect of the present invention, there is provided an impact-resistant methacrylic resin composition comprising a multilayer structure methacrylic resin composition [II] obtained by the following sequential four polymerization stages (i) through (iv):

(i) the first stage of forming 5 to 50 parts by weight of a hard crosslinked resin (A) containing at least 80% by weight of methyl methacrylate units;

(ii) the second stage of obtaining 100 parts by weight of a multilayer structure acrylic elastomer [I] by forming on the periphery of the hard crosslinked resin (A) 95 to 50 parts by weight of a layer of a crosslinked acrylic acid ester copolymer (B) by polymerizing a monomer mixture comprising 69.9 to 89.9% by weight of at least one alkyl acrylate having 1 to 8 carbon atoms in the alkyl group, 10 to 30% by weight of styrene or a mixture of styrene and a derivative thereof and 0.1 to 10% by weight of at least one compound selected from the group consisting of a compound of the formula

(1)

and a compound of the formula

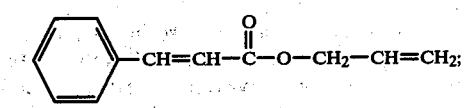
(2)

(iii) the third stage of forming on the periphery of the elastomer [I] 5 to 10 parts by weight of a layer of a hard crosslinked resin (C) by polymerizing a crosslinkable monomer mixture comprising 80 to 99.9% by weight of methyl methacrylate, 0 to 19.9% by weight of at least one alkyl acrylate having 1 to 8 carbon atoms in the alkyl group, 0 to 10% by weight of an other copolymerizable vinyl monomer and 0.1 to 10% by weight of a copolymerizable polyfunctional monomer having at least two carbon-to-carbon unsaturated bonds in the molecule; and (iv) the fourth stages of forming on the periphery of the resin (C) 5 to 1000 parts by weight of a layer of a hard non-cross-linked resin (D) by polymerizing a non-crosslinkable monomer or non-crosslinkable monomer mixture comprising 80 to 100% by weight of methyl methacrylate, 0 to 20% by weight of at least one alkyl acrylate having 1 to 8 carbon atoms in the alkyl group and 0 to 10% by weight of other copolymerizable vinyl, the resin (D)/resin (C) weight ratio being in the range of from 0.5 to 200.

In accordance with another aspect of the present invention, there is provided an impact-resistant methacrylic resin composition comprising the above-mentioned multilayer structure methacrylic resin composition [II] and a methacrylic resin [III] formed by polymerizing 80 to 100% by weight of methyl methacrylate and 0 to 20% by weight of a vinyl or vinylidene monomer, wherein the content of the multilayer structure acrylic elastomer [I] is 1 to 70% by weight based on the total composition.

DESCRIPTION OF THE PREFERRED EMBODIMENTS

One important feature of the present invention is that, as described hereinbefore, in the polymerization for forming a crosslinked acrylic acid ester copolymer having in the interior thereof a core of a hard crosslinked resin, a compound having a special structure defined by the formula (1) or (2) is used as a crosslinking agent and the polymerization is carried out in the specified sequential four stages to obtain a polymer having a multilayer structure.

The process per se for the preparation of the resin composition of the present invention is not particularly critical, but it is preferable to adopt the emulsion polymerization process.

In performing the preparation of the resin composition of the present invention, in order to impart a good transparency to the obtained resin composition, the refractive indexes of the resin phases obtained in the respective polymerization stages should be made equal or as close as possible to one another.

In order to obtain a good balance among transparency, surface appearance and impact resistance-manifesting effect in the resin composition of the present invention, the particle size of the rubbery elastomer to be dispersed should be taken into consideration. In order to obtain a composition excellent in both transparency and impact resistance, the particle size of the rubbery elastome should be 0.13 to 0.45 μm, preferably 0.2 to 0.35 μm, when the polymerization for formation of the crosslinked acrylic acid ester copolymer (B) is substantially completed whereby the two-layer structure acrylic elastomer [I] is obtained.

The multilayer structure acrylic elastomer [I] of the present invention has in the interiors of particles thereof a hard crosslinked resin (A) comprising at least 80% by weight of methyl methacrylate units and also has in the external layers of particles a crosslinked acrylic acid ester copolymer (B).

The hard crosslinked resin (A) referred to in the present invention is a copolymer obtained by polymerizing a monomer mixture comprised of (i) 100 parts by weight of methyl methacrylate or a monomer mixture comprising at least 80% by weight of methyl methacrylate and up to 20% by weight of other copolymerizable vinyl monomer and (ii) 0.1 to 10 parts by weight, preferably 0.5 to 5 parts by weight, of a crosslinking monomer. This hard crosslinked resin (A) occupies 5 to 50 parts by weight, preferably 10 to 40 parts by weight, in 100 parts by weight of the multilayer structure acrylic elastomer [I]. If the amount of the hard crosslinked resin (A) is smaller than 5 parts by weight, the impact resistance-manifesting effect is poor and the transparency is degraded. In contrast, if the amount of the resin (A) exceeds 50 parts by weight, the surface gloss is reduced and the impact resistance is degraded.

As the vinyl monomer copolymerizable with methyl methacrylate that is used for the formation of the hard crosslinked resin (A), styrene, acrylonitrile and alkyl acrylates having 1 to 8 carbon atoms in the alkyl group can be mentioned.

Any crosslinking monomer copolymerizable with methyl methacrylate can be used for the formation of the hard crosslinked resin (A). For example, there can be mentioned bifunctional monomers such as ethylene glycol dimethacrylate, ethylene glycol diacrylate, 1,3-butylene dimethacrylate and tetraethylene glycol diacrylate; trifunctional monomers such as trimethylolpropane triacrylate, triallyl cyanurate and triallyl isocyanurate; and tetrafunctional monomers such as pentaerythritol tetraacrylate. These monomers may be used either alone or in combination.

The crosslinked acrylic acid ester copolymer (B) is a copolymer obtained by polymerizing a monomer mixture comprising 69.9 to 89.9% by weight of at least one alkyl acrylate having 1 to 8 carbon atoms in the alkyl group, preferably n-butyl acrylate or 2-ethylhexyl acrylate, 10 to 30% by weight of styrene or a mixture of styrene and a derivative thereof and 0.1 to 10% by weight of at least one member selected from a compound of the formula

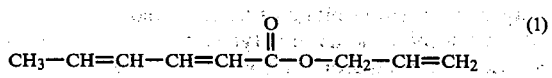
(1)

(allyl sorbate; hereinafter referred to as "ASV") and a compound of the formula

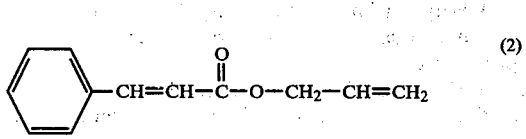
(2)

(allyl cinnamate; hereinafter referred to as "ACM"). The monomer mixture is polymerized in an amount of 95 to 50 parts by weight in the presence of 5 to 50 parts by weight of the hard crosslinked resin (A) to form an external layer on the resin (A). The proportions of the acrylic ester monomer and styrene or the mixture of styrene and a derivative thereof in the monomer mixture are important for imparting good transparency to the resulting resin composition. If the proportions are outside the above ranges, the transparency is degraded. The use of the compound of the formula (1) or (2) is one of most important factors in the present invention. If the compound of the formula (1) or (2) is not used, the intended object of the present invention cannot be attained. The function of the compound of the formula (1) or (2) cannot completely been elucidated, but it is construed that if the compound of the formula (1) or (2) is used, the crosslinking degree of the crosslinked acrylic acid ester copolymer and the grafting degree of methyl methacrylate are controlled with a good balance. The compound of the formula (1) or (2) is used in an amount of 0.1 to 10% by weight, preferably 0.3 to 5.0% by weight, though the appropriate amount varies depending upon whether these compounds of the formulae (1) and (2) are used in combination or alone. In addition to the compound of the formula (1) or (2), a conventional polyfunctional monomer can be used in an amount of up to 9% by weight. The type of the polyfunctional monomer is not particularly critical, but any customary polyfunctional monomer may be used. For example, ethylene glycol diacrylate, ethylene glycol dimethacrylate, 1,3-butylene diacrylate, 1,3-butylene dimethacrylate, tetraethylene glycol diacrylate, tetraethylene glycol dimethacrylate and divinyl benzene can be mentioned.

A crosslinkable monomer mixture is polymerized in the presence of the multilayer structure acrylic elastomer [I] to form the hard crosslinked resin (C). This crosslinkable monomer mixture comprises 80 to 99.9% by weight of methyl methacrylate, 0 to 19.9% by weight of at least one alkyl acrylate having 1 to 8 carbon atoms in the alkyl group, 0 to 10% by weight of other vinyl monomer copolymerizable with the monomers and 0.1 to 10% by weight of a copolymerizable polyfunctional monomer having at least two carbon-to-carbon double bonds in the molecule.

If the content of methyl methacrylate in the monomer mixture is lower than 80% by weight, the transparency, heat resistance and weather resistance are degraded. As the alkyl acrylate copolymerizable with methyl methacrylate, methyl acrylate, ethyl acrylate and butyl acrylate can be mentioned. As the other vinyl monomer that can be used as the comonomer, there can be mentioned styrene, acrylonitrile and methacrylic acid.

If the amount of the acrylic acid ester in the crosslinkable monomer mixture is larger than 19.9% by weight, the heat resistance and transparency of the final composition are poor. If the amount of the other copolymerizable vinyl monomer is larger than 10% by weight, the transparency, weather resistance and water resistance are degraded.

The copolymerizable polyfunctional monomers having at least two carbon-to-carbon double bonds in the molecule, which are an indispensible component of the crosslinkable monomer mixture, include, for example, ethylene glycol diacrylate, ethylene glycol dimethacrylate, 1,3-butylene dimethacrylate, tetraethylene glycol diacrylate, trimethylolpropane triacrylate, triallyl cyanurate, triallyl isocyanurate and pentaerythritol tetraacrylate. These polyfunctional monomers may be used either alone or in combination. If the amount of the polyfunctional monomer used is smaller than 0.1% by weight, the stress-whitening resistance and surface appearance are degraded. If the amount of the polyfunctional monomer used is larger than 10% by weight, the impact resistance-manifesting effect is reduced.

The amount of the hard crosslinked resin (C) used is 5 to 100 parts by weight, preferably 5 to 50 parts by weight, per 100 parts by weight of the two-layer structure acrylic elastomer [I]. If the amount of the hard crosslinked resin (C) is smaller than 5 parts by weight, no substantial improvement of the surface appearance or processability can be attained. If the amount of the resin (A) exceeds 100 parts by weight, reduction of the surface appearance and processability is observed and the impact resistance is degraded.

In the present invention, at the time when polymerization of the crosslinkable monomer mixture is substantially completed, a non-crosslinkable monomer or non-crosslinkable monomer mixture comprising 80 to 100% by weight of methyl methacrylate, 0 to 20% by weight of at least one alkyl acrylate having 1 to 8 carbon atoms in the alkyl group and 0 to 10% by weight of other vinyl monomer copolymerizable with the monomers is polymerized in an amount of 5 to 100 parts by weight, preferably 10 to 700 parts by weight, per 100 parts by weight of the two-layer structure acrylic elastomer [I] to form a hard non-crosslinked resin (D). In this polymerization stage, the resin (D)/resin (C) weight ratio should be in the range of from 0.5 to 200. If the amount of the hard non-crosslinked resin (D) is smaller than 5 parts by weight per 100 parts by weight of the two-layer structure acrylic elastomer [I], the impact resistance is reduced. If the amount of the resin (D) is larger than 1000 parts by weight, the productivity is reduced. If the weight ratio of the hard non-crosslinked resin (D) to the hard crosslinked resin (C) obtained in the preceding stage, that is, the resin (D)/resin (C) weight ratio, is lower than 0.5, the surface appearance, transparency, flowability and impact resistance are reduced. If the resin (D)/resin (C) weight ratio is higher than 200, the productivity is reduced. If the amount of methyl methacrylate in the non-crosslinkable monomer mixture is smaller than 80% by weight, the transparency and heat resistance are degraded.

As the alkyl acrylate having 1 to 8 carbon atoms in the alkyl group that is copolymerized with methyl methacrylate, methyl acrylate, ethyl acrylate and butyl acrylate can be used in an amount of up to 20% by weight. If the amount of the alkyl acrylate is larger than 20% by weight, the heat resistance and transparency are degraded. As the other copolymerizable vinyl monomer, for example, styrene, acrylonitrile and methacrylic acid can be used in an amount of up to 10% by weight. If the amount of the vinyl monomer exceeds 10% by weight, the transparency, weather resistance and water resistance are degraded.

In the present invention, a polymerization degree modifier such as a mercaptan compound may be added to the non-crosslinkable monomer or non-crosslinkable monomer mixture so as to control the molecular weight, if desired. As the polymerization degree modifier, alkyl mercaptans, thioglycolic acid, esters thereof and aromatic mercaptane such as thiophenol and thiocresol can be mentioned. It is preferable to use the polymerization degree modifier in an amount of 0.01 to 5.0% by weight.

The multilayer structure methacrylic resin composition [II] obtained through the series of the above-mentioned polymerization processes can be used as it is. If desired, it may be used after it has been mixed with other thermoplastic resins, preferably a methyl methacrylate resin formed by polymerizing 80 to 100% by weight of methyl methacrylate and 0 to 20% by weight of another vinyl monomer, for example, an alkyl acrylate having 1 to 4 carbon atoms in the alkyl group, so that the content of the two-layer structure acrylic elastomer [I] is 1 to 70% by weight based on the total resin composition.

The process per se for the preparation of the multilayer structure methacrylic resin composition of the present invention is not particularly critical, but it is preferable to adopt an emulsion polymerization process. Accordingly, an embodiment of the preparation of the multilayer structure methacrylic resin composition of the present invention according to the emulsion polymerization will now be described.

A reaction vessel is charged with deionized water and, if necessary, an emulsifier. Then, a monomer mixture forming the hard crosslinked resin (A) is charged and polymerized. Thereafter, a monomer mixture forming the crosslinked acrylic acid ester copolymer (B) is polymerized to obtain the multilayer structure acrylic elastomer [I]. Then, a crosslinkable monomer mixture (C) is polymerized and subsequently a non-crosslinkable monomer or non-crosslinkable monomer mixture (D) is polymerized.

The polymerization temperature is 30° to 120° C., preferably 50° to 120° C. In each of the polymerization stages (A), (B), (C) and (D), the polymerization time is ordinarily 0.5 to 7 hours, though the polymerization time varies depending upon the kinds and amounts of the polymerization initiator and emulsifier and the polymerization temperature.

It is preferred that the monomer/water ratio be in the range of from 1/20 to 1/1. The polymerization initiator and emulsifier may be added to either or both of the aqueous phase and monomer phase.

In each of the polymerization stages (A), (B), (C) and (D), the monomers may be added at once or by lots. However, in view of the generation of polymerization heat, it is preferred that the monomers be added by lots.

Any conventional emulsifier can be used. For example, a long-chain alkyl carboxylic acid salt, a sulfosuccinic acid alkyl ester salt, an alkylbenzenesulfonic acid salt and an N-acyl sarcosinic acid salt may be used as the emulsifier.

The type of the polymerization initiator is not particularly critical. For example, a conventional inorganic initiator such as a water-soluble persulfate or perborate may be used either alone or in combination with a sulfite or thiosulfate as a redox type initiator. Furthermore, a redox type initiator such as organic hydroperoxide-sodium formaldehyde sulfoxylate or an organic initiator such as benzoyl peroxide or azobisisobutyronitrile can be used.

A polymer latex obtained by the emulsion polymerization is coagulated and dried according to known procedures.

In the case where the obtained multilayer structure methacrylic resin composition is incorporated with a methyl methacrylate resin, a melt-mixing method is preferably employed. If desired, additives such as a stabilizer, a lubricant, a plasticizer, a dye, a pigment, and a filler may be added in appropriate amounts to the resin composition prior to the melt-mixing. Then, the mixture is blended by a V-blender or Henschel mixer and melt-kneaded by a mixing roller or screw type extruder.

The obtained resin composition is molded by an extrusion molding machine or injection molding machine, whereby molded articles excellent in transparency and surface appearance as well as impact resistance can be obtained.

The present invention will now be described in detail with reference to the following examples. In these examples, all of "parts" and "%" are by weight.

EXAMPLE 1

(1) Preparation of Hard Crosslinked Resin (A)

A stainless steel reaction vessel having an inner capacity of 50 l was charged with a starting material (a) having the composition described below. Nitrogen was blown into the vessel with stirring so that there was no substantial influence of oxygen. Thereafter, the temperature was elevated to 70° C. and then a starting material (b) having the composition described below was added. Polymerization was carried out for 2 hours to obtain a latex of a hard crosslinked resin (A).

| Starting Material (a) | |
|---|---|
| Deionized water | 20 kg |
| Sarcosinate LN (S-LN) (N—acyl sarcosinic acid salt supplied by Nikko Chemicals) | 9.6 g |
| Boric acid | 40 g |
| Sodium carbonate | 4 g |
| Monomer mixture comprising 97% of methyl methacrylate (MMA), 1% of ethyl acrylate (EA) and 2% of 1,3-butylene dimethacrylate (BDMA) | 1.2 kg |
| Cumene hydroperoxide (CHP) | 6 g |
| Starting Material (b) | |
| Deionized water | 400 g |
| Sodium formaldehyde sulfoxylate (SFS) | 24 g |

The conversion of MMA in this latex was 98.5%, and the particle size was 0.16 μm.

(2) Preparation of Two-layer Structure Acrylic Elastomer [I] by Formation of Crosslinked Acrylic Acid Ester Copolymer (B)

431 g of an aqueous solution containing 14 g of sodium formaldehyde sulfoxylate (hereinafter referred to as "SFS") and 16.8 g of S-LN was charged into the reaction vessel containing therein the hard crosslinked resin latex in an amount corresponding to 1.2 kg of the solids. The temperature was elevated to 80° C., and then an acrylic acid ester monomer mixture having the composition described below was continuously added over a priod of 150 minutes. After completion of the addition, polymerization was conducted for 3 hours to obtain a latex of a two-layer structure acrylic elastomer containing in the interiors of particles thereof the hard crosslinked resin (A) and also having a crosslinked acrylic acid ester type copolymer (B) in the external layer portions of the particles.

| Acrylic acid ester monomer mixture | |
|---|---|
| Monomer mixture comprising 80% of butyl acrylate (BA), 18.5% of styrene (ST) and 1.5% of ACM | 2.8 kg |
| CHP | 14 g |

The conversion of BA was 97%, the conversion of ST was more than 99.5%, and the particle size of the obtained latex was 0.28 μm.

(3) Preparation of Multilayer Structure Methacrylic Resin Composition [II]

To the reaction vessel containing the latex obtained in (2) above in an amount corresponding to 100 parts of the solids of the two-layer structure acrylic elastomer [I], 1.2 parts of S-LN and 10 parts of deionized water were added, while being stirred. Then, a crosslinkable monomer mixture (C) having the composition described below was continuously added over a period of 45 minutes. Polymerization was conducted for 1 hour. Then, a non-crosslinkable monomer mixture (D) having the composition described below was continuously added into the reaction vessel over a period of 400 minutes. Polymerization was conducted for 1 hour to obtain a latex of a multilayer structure methacrylic resin composition [II]. The conversion of the monomer mixtures (C) and (D) were more than 99.5% and 99.5%, respectively.

| Crosslinkable Monomer Mixture (C) | |
|---|---|
| Mixture comprising 92.5% of MMA, 6% of EA and 1.5% of BDMA | 800 g |
| CHP | 2.4 g |
| Non-Crosslinkable Monomer Mixture (D) | |
| Mixture comprising 94% of MMA and 6% of EA | 11.2 g |
| n-octylmercaptan (n-C$_8$SH) | 39.2 g |
| CHP | 44.8 g |

The monomer mixture (D)/monomer mixture (C) weight ratio was 14.

According to the procedure described below, the so-obtained latex was coagulated, washed and then dried to obtain a powder of the multilayer structure methacrylic resin composition [II].

A stainles steel vessel was charged with 14 kg of an aqueous 1.0% sulfuric acid solution. The temperature was elevated to 80° C. with stirring. Then, 7 kg of above-mentioned latex was continuously added over a period of 20 minutes. The inner temperature was elevated to 95° C. and this temperature was maintained for 5 minutes. Then, the temperature was lowered to room temperature. The polymer was recovered by filtration and then washed with deionized water to obtain a white creamy polymer. The polymer was dried at 70° C. for 24 hours to obtain a white powdery polymer.

The powder was melt-kneaded and pelletized by using a screw extruder having an outer diameter of 40 mm (Model P-40-26 AB-V supplied by Nippon Seikosho; L/D=26) at a cylinder temperature of 200° to 260° C. and a die temperature of 250° C. to obtain an impact-resistant methacrylic resin composition [II] containing 25% of the two-layer structure acrylic elastomer [I].

The resin composition was injection-molded under conditions described below. Physical properties of the obtained test pieces were tested. The results are shown in Table 1.

| Injection molding machine: | Screw type automatic injection molding machine Model V-17-65 supplied by Nippon Seikosho |
|---|---|
| Injection molding conditions: | Cylinder temperature of 250° C. and injection pressure of 700 kg/cm$^2$ |
| Size of test piece: | 110 mm × 110 mm × 2 mm (thickness) or 70 mm × 12.5 mm × 6.2 mm (thickness) |

TABLE 1

| Glossiness[1] (%) (incident angle of 60°) | Haze[2] (%) | Total transmission[3] (%) | Izod impact strength[4] (kg·cm/cm) | Dynstat impact strength[5] (kg·cm/cm$^2$) | MI Value[6] (g/10 min, 260° C. × 6 kg) | Tensile strength[7] (kg/cm$^2$) | Defects on surface of molded plate |
|---|---|---|---|---|---|---|---|
| 99.5 | 1.9 | 92.1 | 5.1 | 23.0 | 21.4 | 400 | None |

Note
[1] ASTM D-673-44
[2] and [3] ASTM D-1003-52
[4] ASTM D-256-54T
[5] BS 1330
[6] ASTM D-1238-52T
[7] ASTM D-638-56T

EXAMPLE 2 AND COMPARATIVE EXAMPLES 1 THROUGH 6

An impact-resistant methyacrylic resin composition was prepared in the same manner as described in Example 1 except that the composition of the monomer mixture for formation of the cross-linked acrylic ester type copolymer (B) was changed as shown in Table 2. The results of the tests made on the composition are shown in Table 3.

TABLE 2

Composition (%) of Crosslinked Acrylic Acid Ester Type Copolymer

| | BA | ST | ASV | SVA[1] | MSV[2] | BDMA | EDMA[3] | DVB[4] | AMA[5] |
|---|---|---|---|---|---|---|---|---|---|
| Example 2 | 80 | 18.5 | 1.5 | — | — | — | — | — | — |
| Comparative Example 1 | 80 | 18.5 | — | 1.5 | — | — | — | — | — |
| Comparative Example 2 | 80 | 18.5 | — | — | 1.5 | — | — | — | — |
| Comparative Example 3 | 80 | 18.5 | — | — | — | 1.5 | — | — | — |
| Comparative Example 4 | 80 | 18.5 | — | — | — | — | 1.5 | — | — |
| Comparative Example 5 | 80 | 18.5 | — | — | — | — | — | 1.5 | — |
| Comparative Example 6 | 80 | 18.5 | — | — | — | — | — | — | 1.5 |

Note
[1] Sorbic acid
[2] Methyl sorbate
[3] Ethylene glycol dimethacrylate
[4] Divinyl benzene
[5] Allyl methacrylate

TABLE 3

| | Glossiness (%) (incident angle of 60°) | Haze (%) | Total transmission (%) | Izod impact strength (kg · cm/cm) | Dynstat impact strength (kg · cm/cm$^2$) | Tensile strength (kg/cm$^2$) | Defects on surface of molded plate |
|---|---|---|---|---|---|---|---|
| Example 2 | 99.2 | 1.8 | 92.0 | 4.7 | 22 | 410 | None |
| Comparative Example 1 | 34.0 | 30.5 | 83.0 | 2.5 | 10.0 | 320 | Poor gloss, flow marks observed |
| Comparative Example 2 | 47.5 | 25.6 | 85.1 | 2.4 | 11.3 | 340 | Poor gloss, flow marks observed |
| Comparative Example 3 | 88.8 | 2.7 | 91.5 | 2.2 | 9.6 | 380 | None |
| Comparative Example 4 | 89.5 | 2.9 | 91.4 | 1.9 | 10.4 | 360 | None |
| Comparative Example 5 | 89.2 | 2.8 | 91.0 | 2.0 | 10.0 | 370 | None |
| Comparative Example 6 | 89.8 | 3.8 | 91.4 | 3.6 | 15.4 | 390 | Flow marks observed |

EXAMPLES 3 AND 4 COMPARATIVE EXAMPLES 7 THROUGH 10

(1) Preparation of Hard Crosslinked Resin (A)

A stainless steel reaction vessel having an inner capacity of 50 l was charged with a starting material (a) having the composition described below and 3 g of tertiary butyl hydroperoxide (t-BH). Nitrogen was blown into the reaction vessel so that there was no substantial oxygen present. The temperature was elevated with stirring. When the inner temperature reached 70° C., 500 g of an aqueous 5% SFS solution was added. Polymerization was conducted for 1 hour while controlling the inner temperature to 80° C. Then, 500 g of an aqueous 3% S-LN solution was added and then a starting material (b) having the composition described below, which contained 3 g of t-BH dissolved therein, was added. Polymerization was conducted for 1 hour to obtain a latex of a hard crosslinked resin (A).

| Starting Material (a) | |
|---|---|
| Deionized water | 19.5 kg |
| S-LN | 10 g |
| Boric acid | 100 g |
| Sodium carbonate | 10 g |
| Ferrous sulfate | 0.04 g |
| Disodium ethylenediamine-tetraacetate | 0.12 g |
| Mixture comprising 96% of MMA, 1% of BA and 3% of BDMA | 1000 g |
| Starting Material (b) | |
| Mixture comprising 96% of MMA, 1% of BA and 3% of BDMA | 1000 g |

The conversion MMA in this latex was 98.5%.

(2) Preparation of Two-Layer Structure Acrylic Elastomer [I]

To the reaction vessel containing the latex of the hard crosslinked resin (A) obtained by the polymerization in (1) above, 500 g of an aqueous 7% SFS solution and 500 g of an aqueous 6% S-LN solution were added. Then, 8.04 kg of an acrylic acid ester monomer mixture having the composition shown in Table 4 and containing 40 g of t-BH dissolved therein was continuously added at a rate of 3.2 per kg hour while controlling the inner temperature to 80° C. After completion of the addition, polymerization was conducted for 3 hours to form a crosslinked acrylic acid ester copolymer (B), whereby a latex of a two-layer structure acrylic elastomer [I] containing the hard crosslinked resin in the interiors of particles was obtained.

TABLE 4

Monomer Composition (%) of Cross-linked Acrylic Acid Ester Copolymer (B)

| | BA | ST | ACM | ASV | BDMA | AMA[1] |
|---|---|---|---|---|---|---|
| Example 3 | 80 | 18.0 | 1.0 | 1.0 | — | — |
| Example 4 | 80 | 18.0 | 1.2 | — | 0.8 | — |
| Comparative Example 7 | 80 | 20 | — | — | — | — |
| Comparative Example 8 | 68 | 17 | — | 15 | — | — |

TABLE 4-continued

Monomer Composition (%) of Cross-linked Acrylic Acid Ester Copolymer (B)

|  | BA | ST | ACM | ASV | BDMA | AMA[1] |
|---|---|---|---|---|---|---|
| Comparative Example 9 | 80 | 19.95 | — | 0.05 | — | — |
| Comparative Example 10 | 80 | 18.0 | — | — | — | 2.0 |

Note

TABLE 5

|  | Glossiness (%) (incident angle of 60°) | Haze (%) | Total transmission (%) | Izod impact strength (kg cm/cm) | Dynstat impact strength (kg cm/cm$^2$) | Tensile strength (kg/cm$^2$) | Defects on surface of molded plate |
|---|---|---|---|---|---|---|---|
| Example 3 | 99.0 | 1.9 | 92.0 | 4.3 | 18.4 | 470 | None |
| Example 4 | 99.4 | 1.7 | 92.1 | 4.4 | 19.2 | 455 | None |
| Comparative Example 7 | 48.0 | 26.0 | 80.0 | 2.2 | 9.0 | 330 | Poor gloss, flow marks observed |
| Comparative Example 8 | 82.0 | 17.6 | 88.0 | 1.9 | 7.5 | 385 | Flow marks observed |
| Comparative Example 9 | 60.5 | 11.5 | 82.0 | 2.1 | 10.8 | 345 | Poor gloss, flow marks observed |
| Comparative Example 10 | 78.8 | 6.5 | 90.2 | 2.6 | 11.2 | 395 | Poor gloss, flow marks observed |

[1]Allyl methacrylate

In each run, the conversion of each of BA and ST was higher than 98%, and the particle size of the obtained latex was 0.25 to 0.28 μm.

(3) Preparation of Multilayer Structure Methacrylic Resin Composition [II]

To the vessel containing the two-layer structure acrylic elastomer [I] obtained in (2) above, 500 g of an aqueous 1% S-LN solution was added. Thereafter, a crosslinkable monomer mixture (C) having the composition shown below and containing 3 g of t-BH was continuously added over a period of 1 hour while controlling the inner temperature to 80° C. Polymerization was then conducted for 1 hour. Then, 500 g of an aqueous 7% SFS solution and 500 g of an aqueous 6% S-LN solution were added. Then, a non-crosslinkable monomer mixture (D) having the composition shown below and containing 22 g of t-BH and 8.2 g of n-C$_8$SH was continuously added at a rate of 3700 g per hour. After completion of the addition, polymerization was conducted for 90 minutes to obtain a latex of a multilayer structure methacrylic resin composition [II]. In each run, the conversion of each of the monomer mixtures (C) and (D) was higher than 99.0%.

| Crosslinkable Monomer Mixture (C): | |
|---|---|
| Mixture comprising 98.5% of MMA, 1.0% of BA, and 0.5% of BDMA | 1000 g |
| Non-crosslinkable Monomer Mixture (D): | |
| Mixture comprising 99% of MMA and 1.0% of BA | 6000 g |

The monomer mixture (D)/monomer mixture (C) weight ratio was 6.0.

A white powdery polymer was prepared from the so-obtained latex under the same conditions according to the same procedures as in Example 1.

Then, 3.4 kg of the powdery multilayer structure methacrylic resin composition was mixed with 6.6 kg of Acripet VH (methacrylic resin material supplied by Mitsubishi Rayon Co.) by a Henschel mixer. The mixture was melt-kneaded and pelletized in the same screw extruder as used in Example 1 at a cylinder temperature of 200° to 270° C. and a die temperature of 260° C. to obtain an impact-resistant methacrylic resin composition containing 20% by weight of the two-layer structure acrylic elastomer [I].

The resin composition was injection-molded under the same conditions as described in Example 1, and the obtained test pieces were tested. The results are shown in Table 5.

EXAMPLE 5 AND COMPARATIVE EXAMPLES 11 AND 12

An impact-resistant methacrylic resin composition [II] was prepared according to the same procedures as described in (1) through (3) of Example 3 except that the composition of the monomer mixture used for formation of the hard crosslinked resin (A) was changed as shown in Table 6. The properties were evaluated in the same manner as in Example 3. The results are shown in Table 7.

TABLE 6

|  | MMA (%) | Methyl acrylate (MA) (%) | Tetraethylene glycol diacrylate (C$_4$—DA) (%) | ST (%) |
|---|---|---|---|---|
| Example 5 | 97 | 1 | 2 | — |
| Comparative Example 11 | 99 | 1 | — | — |
| Comparative Example 12 | 30 | — | 2 | 68 |

TABLE 7

|  | Haze (%) | Total transmission (%) | Izod impact strength (kg · cm/cm) | Defects on surface of molded plate |
|---|---|---|---|---|
| Example 5 | 1.8 | 92.0 | 4.2 | None |
| Comparative Example 11 | 1.8 | 92.0 | 2.9 | None |
| Comparative Example 12 | 27.0 | 79.0 | 4.0 | Poor transparency |

EXAMPLES 6 AND 7 AND COMPARATIVE EXAMPLES 13 THROUGH 15

A methacrylic resin composition was prepared in the same manner as described in Example 3 except that the monomers and additives of the crosslinkable monomer mixture (C) and non-crosslinkable monomer mixture and the (D)/(C) weight ratio were changed as shown in Table 8. The properties were evaluated in the same manner as in Example 3. The results are shown in Table 9.

TABLE 8

| | Amount (g) of crosslinkable monomer mixture (C) | Amounts (g) of non-crosslinkable monomer mixture (D) | (D)/(C) weight ratio | Composition (%) of cross-linkable monomer mixture (C) | | | | Composition (%) of non-cross-linkable monomer mixture (D) | | |
|---|---|---|---|---|---|---|---|---|---|---|
| | | | | MMA | EA | BDMA | TMP-3A[1] | MMA | EA | n-C$_8$SH (g) |
| Example 6 | 700 | 6300 | 9 | 96 | 1 | 3 | — | 97 | 3 | 9.5 |
| Example 7 | 1000 | 6000 | 6 | 96 | 2.5 | — | 0.5 | 97 | 3 | 9.0 |
| Comparative Example 13 | 6000 | 1000 | 0.167 | 96 | 2.5 | — | 0.5 | 97 | 3 | 1.5 |
| Comparative Example 14 | 1000 | 6000 | 6 | 84 | 1 | — | 15 | 97 | 3 | 9.0 |
| Comparative Example 15 | — | 7000 | — | — | — | — | — | 97 | 3 | — |

Note
[1] Trimethylolpropane triacrylate

TABLE 9

| | Glossiness (%) (incident angle of 60°) | Haze (%) | Izod imapct strength (kg.cm/cm) | M.I. value (g/10 min, 260° C. × 6 kg) | Defects of surface molded plate |
|---|---|---|---|---|---|
| Example 6 | 99.6 | 1.9 | 4.6 | 21.3 | None |
| Example 7 | 99.2 | 1.8 | 4.2 | 22.1 | None |
| Comparative Example 13 | 85.1 | 7.6 | 2.3 | 13.6 | Uneven gloss, flow marks observed |
| Comparative Example 14 | 95.2 | 2.9 | 2.4 | 10.2 | flow marks observed |
| Comparative Example 15 | 87.8 | 4.3 | 4.1 | 9.7 | Poor gloss, flow marks observed |

We claim:

1. An impact-resistant methacrylic resin composition comprising a multilayer structure methacrylic resin composition [II] obtained by the following sequential four polymerization stages (i) through (iv):

(i) the first stage of forming 5 to 50 parts by weight of a hard crosslinked resin (A) containing at least 80% by weight of methyl methacrylate units;

(ii) the second stage of obtaining 100 parts by weight of a multilayer structure acrylic elastomer [I] by forming on the periphery of said hard crosslinked resin (A) 95 to 50 parts by weight of a layer of a crosslinked acrylic acid ester copolymer (B) by polymerizing a monomer mixture comprising 69.9 to 89.9% by weight of at least one alkyl acrylate having 1 to 8 carbon atoms in the alkyl group, 10 to 30% by weight of styrene or a mixture of styrene and a derivative thereof and 0.1 to 10% by weight of at least one compound selected from the group consisting of a compound of the formula:

and a compound of the formula:

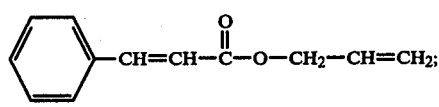

(iii) the third stage of forming on the periphery of said elastomer [I] 5 to 100 parts by weight of a layer of a hard crosslinked resin (C) by polymerizing a crosslinkable monomer mixture comprising 80 to 99.9% by weight of methyl methacrylate, 0 to 19.9% by weight of at least one alkyl acrylate having 1 to 8 carbon atoms in the alkyl group, 0 to 10% by weight of other copolymerizable vinyl monomer and 0.1 to 10% by weight of a copolymerizable polyfunctional monomer having at least two carbon-to-carbon double bonds in the molecule; and (iv) the fourth stage of forming on the periphery of said resin (C) 5 to 1000 parts by weight of a layer of a hard non-crosslinked resin (D) by polymerizing a non-crosslinkable monomer or non-crosslinkable monomer mixture comprising 80 to 100% by weight of methyl methacrylate, 0 to 20% by weight of at least one alkyl acrylate having 1 to 8 carbon atoms in the alkyl group and 0 to 10% by weight of other copolymerizable vinyl monomer, the resin (D)/resin (C) weight ratio being in the range of from 0.5 to 200.

2. An impact resistant methacrylic resin composition as set forth in claim 1, wherein the multilayer structure methacrylic resin composition [II] comprises 5 to 30 parts by weight of the hard crosslinked resin (A), 95 to 70 parts by weight of the crosslinked acrylic acid ester copolymer (B), 5 to 40 parts by weight of the hard crosslinked resin (C) and 10 to 500 parts by weight of the hard non-crosslinked resin (D), the total amount of the resin (A) and the copolymer (B) being 100 parts by weight and the resin (D)/resin (C) weight ratio being in the range of from 0.5 to 100.

3. An impact resistant methacrylic resin composition as set forth in claim 1, wherein the multilayer structure methacrylic resin composition [II] is prepared by emulsion polymerization.

4. An impact resistant methacrylic resin composition as set forth in claim 1, wherein the hard crosslinked resin (A) in the multilayer structure methacrylic resin composition [II] is prepared by polymerizing a monomer mixture comprising 99 to 93% by weight of methyl methacrylate, 0.5 to 7.0% by weight of an alkyl acrylate and 0.5 to 5% by weight of a polyfunctional monomer.

5. An impact resistant methacrylic resin composition as set forth in claim 4, wherein the polyfunctional monomer used for the hard crosslinked resin (A) is 1,3-butylene dimethacrylate.

6. An impact resistant methacrylic resin composition as set forth claim 1, wherein the crosslinked acrylic acid ester copolymer (B) in the multilayer structure methacrylic resin composition [II] is prepared by polymerizing a monomer mixture comprising 75 to 85% by weight of the alkyl acrylate, 14.9 to 24.9% by weight of styrene and 0.1 to 5% by weight of at least one compound selected from the group consisting of a compound of the formula

and the compound of the formula

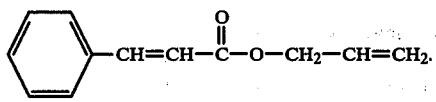

7. An impact resistant methacrylic resin composition as set forth in claim 1, wherein the alkyl acrylate used for the formation of the crosslinked acrylic acid ester copolymer (B) is butyl acrylate.

8. An impact resistant methacrylic resin composition as set forth in claim 1, wherein the crosslinked acrylic acid ester copolymer (B) is prepared by polymerizing a monomer mixture comprising butyl acrylate, styrene, the compound of the formula

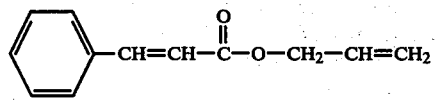

and 1,3-butylene dimethacrylate.

9. An impact resistant methacrylic resin composition as set forth in claim 1, wherein the hard crosslinked resin (C) in the multilayer structure resin composition [II] is prepared by polymerizing a crosslinkable monomer mixture comprising 99 to 93% by weight of methyl methacrylate, 0.5 to 7.0% by weight of the alkyl acrylate and 0.5 to 5% by weight of 1,3-butylene dimethacrylate.

10. An impact resistant methacrylic resin composition as set forth in claim 1, wherein the hard non-crosslinked resin (D) in the multilayer structure methacrylic resin composition [II] is prepared by polymerizing a monomer mixture comprising 94 to 99.5% by weight of methyl methacrylate and 6 to 0.5% by weight of the alkyl acrylate.

11. An impact resistant methacrylic resin composition as set forth in claim 1, wherein the resin (D)/resin (C) weight ratio in the multilayer structure methacrylic resin composition [II] is in the range of from 6 to 14.

12. An impact resistant methacrylic resin composition as set forth in claim 1, wherein the multilayer structure methacrylic resin composition [II] is prepared by emulsion polymerization and the particle size of the multilayer structure methacrylic resin composition [II] is in the range of from 0.2 to 0.35 μm.

13. An impact-resistant methacrylic resin composition comprising:
a multilayer structure methacrylic resin composition [II] obtained by the following sequential four polymerization stages (i) through (iv):

(i) the first stage of forming 5 to 50 parts by weight of a hard crosslinked resin (A) containing at least 80% by weight of methyl methacrylate units;

(ii) the second stage of obtaining 100 parts by weight of a multilayer structure acrylic elastomer [I] by forming on the periphery of said hard crosslinked resin (A) 95 to 50 parts by weight of a layer of a crosslinked acrylic acid ester copolymer (B) by polymerizing a monomer mixture comprising 69.9 to 89.9% by weight of at least one alkyl acrylate having 1 to 8 carbon atoms in the alkyl group, 10 to 30% by weight of styrene or a mixture of styrene and a derivative thereof and 0.1 to 10% by weight of at least one compound selected from the group consisting of a compound of the formula:

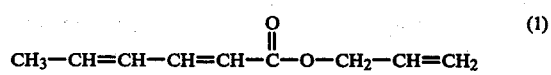

and a compound of the formula

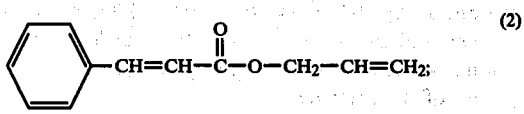

(iii) the third stage of forming on the periphery of said elastomer [I] 5 to 100 parts by weight of a layer of a hard crosslinked resin (C) by polymerizing a crosslinkable monomer mixture comprising 80 to 99.9% by weight of methyl methacrylate, 0 to 19.9% by weight of at least one alkyl acrylate having 1 to 8 carbon atoms in the alkyl group, 0 to 10% by weight of other copolymerizable vinyl monomer and 0.1 to 10% by weight of a copolymerizable polyfunctional monomer having at least two carbon-to-carbon double bonds in the molecule; and (iv) the fourth stage of forming on the periphery of said resin (C) 5 to 1000 parts by weight of a layer of a hard non-crosslinked resin (D) by polymerizing a non-crosslinkable monomer or non-crosslinkable monomer mixture comprising 80 to 100% by weight of methyl methacrylate, 0 to 20% by weight of at least one alkyl acrylate having 1 to 8 carbon atoms in the alkyl group and 0 to 10% by weight of other copolymerizable vinyl monomer, the resin (D)/resin (C) weight ratio being in the range of from 0.5 to 200; and a methacrylic resin [III] formed by polymerizing 80 to 100% by weight of methyl methacrylate and 0 to 20% by weight of a vinyl or vinylidene monomer; wherein the content of the multilayer structure acrylic elastomer [I] is 1 to 70% by weight based on the total weight of the impact-resistant methacrylic resin composition.

14. An impact resistant methacrylic resin composition as set forth in claim 13, wherein the multilayer structure methacrylic resin composition [II] comprises 5 to 30 parts by weight of the hard crosslinked resin (A), 95 to 70 parts by weight of the crosslinked acrylic acid ester copolymer (B), 5 to 40 parts by weight of the hard crosslinked resin (C) and 10 to 500 parts by weight of the hard non-crosslinked resin (D), the total amount of the resin (A) and the copolymer (B) being 100 parts by weight, and the resin (D)/resin (C) weight ratio being in the range of from 0.5 to 100.

15. An impact resistant methacrylic resin composition as set forth in claim 13, wherein the multilayer structure methacrylic resin composition [II] is prepared by emulsion polymerization.

16. An impact resistant methacrylic resin composition as set forth in claim 13, wherein the hard crosslinked resin (A) in the multilayer structure methacrylic resin composition [II] is prepared by polymerizing a monomer mixture comprising 99 to 93% by weight of methyl methacrylate, 0.5 to 7.0% by weight of an alkyl acrylate and 0.5 to 5% by weight of a polyfunctional monomer.

17. An impact resistant methacrylic resin composition as set forth in claim 16, wherein the polyfunctional monomer used for the hard crosslinked resin (A) is 1,3-butylene dimethacrylate.

18. An impact resistant methacrylic resin composition as set forth in claim 13, wherein the crosslinked acrylic acid ester copolymer (B) in the multilayer structure methacrylic resin composition [II] is prepared by polymerizing a monomer mixture comprising 75 to 85% by weight of the alkyl acrylate, 14.9 to 24.9% by weight of styrene and 0.1 to 5% by weight of at least one compound selected from the group consisting of a compound of the formula

and the compound of the formula

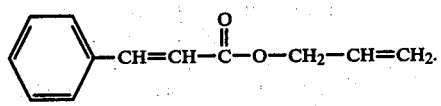

19. An impact resistant methacrylic resin composition as set forth in claim 13, wherein the alkyl acrylate used for the formation of the crosslinked acrylic acid ester copolymer (B) is butyl acrylate.

20. An impact resistant methacrylic resin composition as set forth in claim 13, wherein the crosslinked acrylic acid ester copolymer (B) is prepared by polymerizing a monomer mixture comprising butyl acrylate, styrene, the compound of the formula

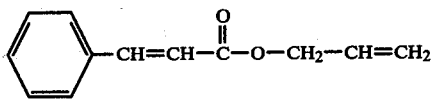

and 1,3-butylene dimethacrylate.

21. An impact resistant methacrylic resin composition as set forth in claim 13, wherein the hard crosslinked resin (C) in the multilayer structure resin composition [II] is prepared by polymerizing a crosslinkable monomer mixture comprising 99 to 93% by weight of methyl methacrylate, 0.5 to 7.0% by weight of the alkyl acrylate and 0.5 to 5% by weight of 1,3-butylene dimethacrylate.

22. An impact resistant methacrylic resin composition as set forth in claim 13, wherein the hard non-crosslinked resin (D) in the multilayer structure methacrylic resin composition [II] is prepared by polymerizing a monomer mixture comprising 94 to 99.5% by weight of methyl methacrylate and 6 to 0.5% by weight of the alkyl acrylate.

23. An impact resistant methacrylic resin composition as set forth in claim 13, wherein the resin (D)/resin (C) weight ratio in the multilayer structure methacrylic resin composition [II] is in the range of from 6 to 14.

24. An impact resistant methacrylic resin composition as set forth in claim 13, wherein the multilayer structure methacrylic resin composition [II] is prepared by emulsion polymerization and the particle size of the multilayer structure methacrylic resin composition [II] is in the range of from 0.2 to 0.35 μm.

25. An impact resistant methacrylic resin composition as set forth in claim 13, wherein the methacrylic resin [III] is obtained by polymerizing a monomer mixture comprising 85 to 99.5% by weight of methyl methacrylate and 15 to 0.5% by weight of an alkyl acrylate.

26. An impact resistant methacrylic resin composition as set forth in claim 13, wherein the multilayer structure methacrylic resin composition [II] is mixed with the methacrylic resin [III] so that the content of the multilayer structure acrylic elastomer [I] is 5 to 355 by weight based on the total weight of the impact resistant methacrylic resin composition.

27. A molded article obtained by injection molding or extrusion molding of the resin composition as set forth in claim 13.

* * * * *

UNITED STATES PATENT AND TRADEMARK OFFICE
CERTIFICATE OF CORRECTION

PATENT NO. : 4,433,103

DATED : February 21, 1984

INVENTOR(S) : Kazumasa KAMATA
Masamitsu TATEYAMA

It is certified that error appears in the above-identified patent and that said Letters Patent is hereby corrected as shown below:

On the title page insert:

-- [30] Foreign Application Priority Data

May 31, 1982 [JP] Japan......57-92287 --.

Signed and Sealed this

Twenty-ninth Day of May 1984

[SEAL]

Attest:

GERALD J. MOSSINGHOFF

Attesting Officer

Commissioner of Patents and Trademarks